Patented Nov. 4, 1952

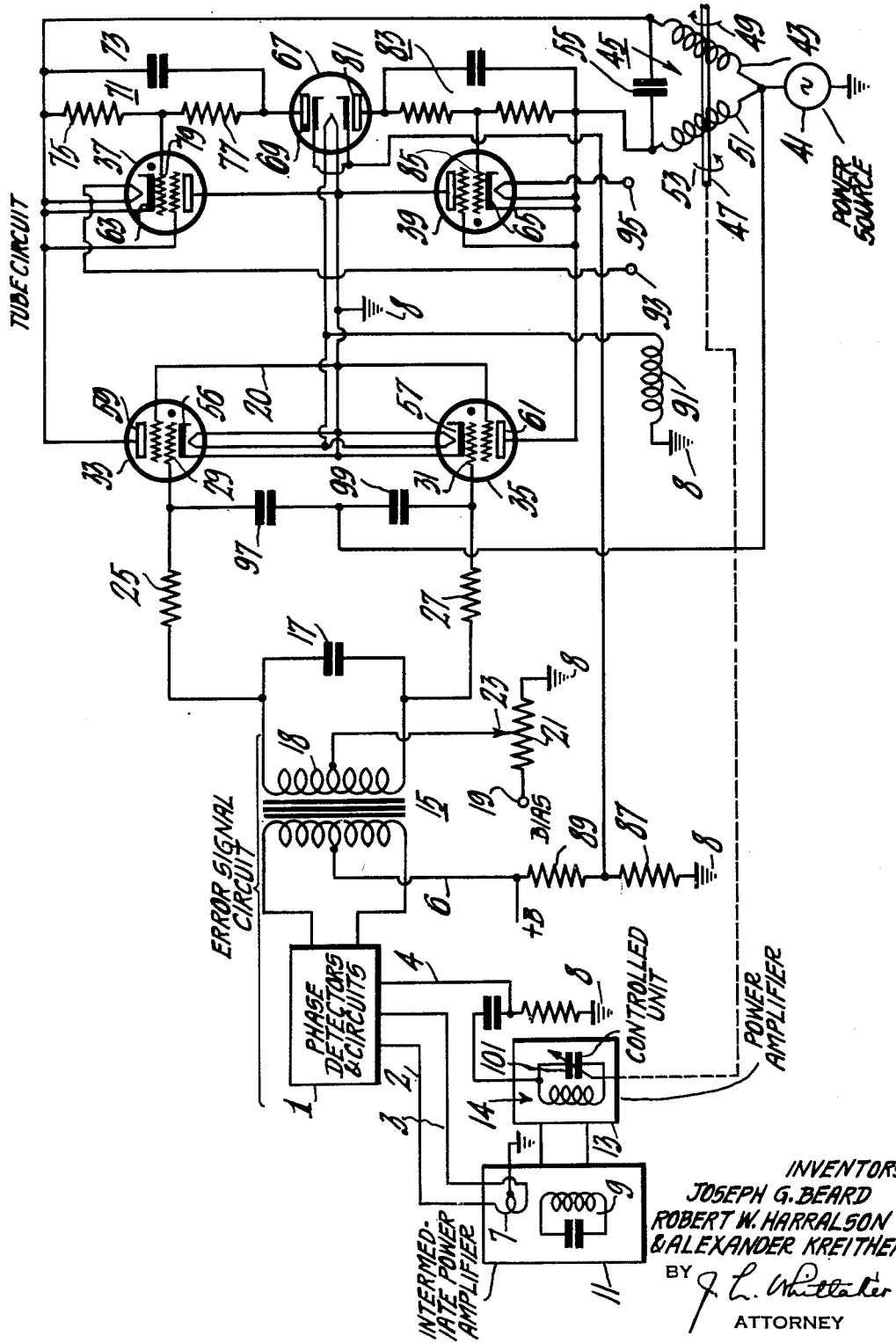

2,617,084

UNITED STATES PATENT OFFICE 2,617,084

SERVO SYSTEM WITH ANTIHUNT MEANS

Joseph G. Beard, Haddonfield, and Robert W. Harralson, Masonville, N. J., and Alexander Kreithen, Washington, D. C., assignors to Radio Corporation of America, a corporation of Delaware Application April 8, 1950, Serial No. 154,756

18 Claims. (Cl. 318—263)

This invention relates to servo-mechanism systems and particularly to systems employing antihunting means or circuits.

The automatic tuning of high frequency circuits has presented a severe and exacting problem in that small movements about the desired adjusted positions of the physical tuning units in the circuits cause undesired results. The physical tuning units must be controlled accurately and precisely. As the units approach and reach their desired positions, hunting should be eliminated. For these reasons, as expedients, the application of electromagnetic brakes or increases in biasing voltages have been used to stop quickly the driver motor when the desired settings have been reached. These expedients tend to prevent hunting or overruns beyond the desired setting positions by their damping effect. However, they also tend to prevent the desired setting from being reached quickly. Therefore, these expedients have not always been satisfactory.

In the system of this invention, the electromagnetic brakes heretofore applied to the driver motor and the increases in biasing voltages may be eliminated, and the speed of the adjusted unit in reaching its desired setting is as fast or faster than that which is obtainable with the prior expedients.

In the present system, it is contemplated that the motor may drive the controlled unit with great rapidity to the desired position in response to an error signal, when a considerable positional adjustment is required. The controlled unit may then overrun somewhat the desred position. On reversal in direction of rotation of the motor, the available driving power in response to the error signal is reduced. Therefore, the adjustable unit then slowly reaches the desired position of correspondence with a master signal without hunting. This result is accomplished, in accordance with the invention, by a system having one response characteristic to signals for a predetermined interval after the initiation of an error signal, and having a second response characteristic applying greater power after the predetermined interval. Preferably, the predetermined interval is chosen to be less than a period of the natural hunting frequency of the system when it has its second greater response. Thus on the initiation of an error signal the controlled unit is driven slowly at first. If, within the short predetermined interval, it reaches the desired position of stability or equilibrium no further error signal is received. The unit therefore stops without overshoot. Ig, however, it does not reach the desired position in this short interval, it is driven with greater rapidity and power to and beyond the desired position. The return error signal is thereupon initiated, which returns the unit through the short overshoot distance without hunting. Both the natural hunting frequency of a system and its tendency to hunt increases with the driving power applied in response to an error signal. Consequently, in designing servo systems, the restoring or positioning power applied in response to an error signal is desirably made large to cause quick positioning, but is limited to prevent hunting. The limitation on the restoring power is overcome to a great extent in the preferred embodiment of the invention.

In the preferred embodiment of the invention, there are two groups of thyratron tubes each group consisting of a pair of tubes interconnected in circuit with each other and with the windings of a two-phase induction motor to apply power thereto from a suitable power source. The tubes are also connected to the source of an error signal responsive to the positioning of a unit driven by the shaft of the motor. The response may be to unbalance a pair of balanced error signals, or to change polarity or phase of such signals. In other words, the response in direction depends on the signal sense. Power applied through one of the pair of tubes drives the motor in one direction in response to an error signal of one characteristic. The other pair of tubes are conductive and drive the motor in the other direction in response to error signals of the other characteristic. However, only one of a pair of tubes can conduct for a predetermined interval after the initiation of error signals causing conduction in that pair of tubes. Accordingly, the system may be designed to have motor power applied through the two tubes of one pair to a degree which normally would result in hunting. Hunting, however, does not occur because after the first overrun and on the return of the driven unit to its desired position, only one of the other pair of tubes may be conductive for the predetermined interval, which is preferably less than the natural period of hunting when both of the pair are conductive. Accordingly, the driven unit comes to rest at a position of stability whereupon no further error signals are received. The unit remains at rest in the desired position without hunting. It will be clear to those skilled in the art that the driving force applied through the two tubes may be made greater than that which would ordinarily be limited by considerations of hunting.

Accordingly, it is one object of the invention to provide a more efficient anti-hunt system than has heretofore been available.

Another object is to prevent hunting in a servo mechanism system.

Still another object of the invention is to provide a rapidly positioning anti-hunting servo system.

Another object of the invention is to overcome the limitations imposed by hunting considerations in the power applied to the driven units in a servo mechanism in response to an error signal.

These and other objects, advantages, and novel features will be apparent from the description of the invention hereinafter set forth in detail and from the drawing made a part hereof in which the sole figure shows one embodiment of the invention which may be applied to a control system for the tuning of a transmitter.

Referring now more particularly to the drawing, 1 represents a phase detector and associated circuits. The phase detector may be connected by leads 2 and 3 respectively to opposite sides of a center tapped transformer 7 the center tap being grounded. The transformer 7 is coupled to the resonant circuit 9 of an intermediate power amplifier 11. A power amplifier stage 13 has a tuned circuit 14 to be tuned to the same frequency as that of the intermediate power amplifier tuned circuit 9 and is connected to lead 4 of the phase detector through a phase shifting circuit. The phase shifting circuit shifts the phase of the signal 90°. The intermediate power amplifier 11 and the means of deriving the signals therefrom are illustrated in Fig. 2 of the patent to J. G. Beard et al., 2,455,646, December 7, 1948. This same patent shows and describes circuits which may be used for the phase detector and circuits 1. The output of phase detector 1 is manifested by an unbalance in the output from a transformer 15 (corresponding to transformer 28 in Fig. 3 of said patent) that is, by a rise in voltage on one extreme terminal or the other thereof.

Transformer 15 has a capacitor 17 connected across the center tapped secondary 18 thereof to resonate the secondary at 60 cycles per second, for the reasons explained in the said patent. The center tap of the secondary 18 of transformer 15 is connected to a bias source 19 by connection to a tap 23 on potentiometer 21. One terminal of potentiometer 21 is connected to a bias source 19 and another to a common ground conductor 8 conventionally shown. This bias is fed through the secondary 18, thence through resistors 25 and 27 respectively to the control grids 29 and 31 of tubes 33 and 35 respectively. This bias prevents tubes 31 and 33 from firing when the phase detector 1 is in balance as explained in the said patent. The phase detector 1 and transformer 15 act as an error signal circuit. Initiation of a signal (increase of voltage at one end terminal or the other of secondary 18) causes one of a pair of tubes or the other to apply power to a motor in one direction or the other, as will be seen.

Tube 33 is one of a pair of gas tubes preferably of the type called thyratrons, the other of which is tube 37. Tube 35 is one of a second pair of gas thyratron tubes, the other tube of which is tube 39. These two pairs of tubes 33, 37 and 35, 39 are interconnected in a tube circuit. One pair of tubes 33, 37 applies power from a source 41 through the tube circuit and through one of the windings 43 of a two phase A.-C. induction motor 45 to turn the shaft 47 thereof in one direction as indicated by the arrow 49. The other pair of tubes 35, 39 applies power through the other winding 51 of motor 45 to turn the shaft 47 in the other direction as indicated by the arrow 53. One pair of tubes or the other applies power to motor 45 in response to an error signal initiated by the phase detector 1. Capacitor 55 is the phasing capacitor of the induction motor and is connected across the windings 43, 51. Cathodes 56 and 57 of tubes 33 and 35 respectively are connected to ground 8. Anodes 59 and 61 of tubes 33 and 35 respectively are connected to cathode 63 and 65 of tubes 37 and 39 respectively. A double rectifier tube 67 has one anode 69 connected through a time delay circuit 71 to the cathode 63 and anode 59 respectively of the first pair of tubes 37, 33. Time delay circuit 71 comprises a capacitor 73 connected across two resistors 75 and 77, the junction of which is connected to the control grid 79 of the tube 37. The anode 81 of rectifier tube 67 is connected through a time delay circuit 83 similar to the circuit 71 to the anode 61 and cathode 65 and to the control grid 85 of tube 39. The cathodes of tube 67 are connected together and to the junction between two resistors 87 and 89 connected between a B+ supply and ground 8. The B+ supply goes to the center tap of transformer 15 for application to tubes in the phase detector and circuits 1. The heaters of tubes 33, 35, and 67 have one terminal connected to ground 8 and the other terminal connected to the secondary 91 of a conventional transformer supplying 6.3 volts thereto which may be coupled to the source 41. The heaters of tubes 37 and 39 may be supplied with voltage through leads 93 and 95 respectively of 6.3 volts with respect to the cathodes 83 and 65 respectively by suitable transformers. The source 41 also supplies a signal to the junction between two capacitors 97 and 99 the other terminal of each of which is connected respectively to the control grids 29 and 31. The signal thus supplied to the control grids 29 and 31 is 90° out of phase with respect to the voltage which is applied to the respective anodes 59 and 61, by proper choice of the capacitor and resistor values in these grid circuits. The shaft 47 is connected mechanically to a variable capacitor 101 which tunes the tuned circuit 14 of the power amplifier 13.

In operation, let it be assumed that the tuned circuit 14 is mistuned from the resonant frequency of the intermediate power amplifier 11. The phase detector and circuits 1 will provide an error voltage through transformer 15 at one of the grids 29, 31 which exceeds the voltage at the other grid. This voltage will be sufficient to overcome the bias from source 19 and to cause one of the tubes 33, 35, say, 33 to fire. Before the initiation of the error signal at the grid 29 of tube 33, there has been appreciable A.-C. voltage available at the terminal of winding 43 to be impressed across the delay circuit 71 and the rectifier 67. By rectification, the circuit 71 has applied a time delay bias to the grid 79 of tube 37. Therefore, only the tube 33 is fired. The tubes 35, 37, and 39 are quiescent. When tube 33 fires, the voltage at the terminal of winding 43 impressed on anode 59 is substantially short-circuited to ground, and the rectifier tube 67 no longer rectifies through the anode 69. Current is now applied to winding 43 of motor 45 on first halves of the A.-C. cycles. The time delay bias voltage begins to decay in the time delay circuit 71. The control grid 79 gradually approaches, by going more positive, the voltage of the cathode 63 of tube 37. Thus the tube 37 can now fire on the second half cycles duirng which tube 33 does not fire, anode 59 going negatively with respect to cathode 56. Thus current is now applied on second halves as well as first halves of the A.-C. cycles to winding 43. The conduction of tube 37 begins after and only after a predetermined time interval. This time interval is governed by the constants of the time delay circuit 71 and the voltage developed thereacross.

It is apparent that there is an initial predetermined time interval during which only tube 33 conducts with the signal on the control grid 29 greater than the signal on control grid 31. If the capacitor 101 is only slightly mistuned, the current through the tube 33 by which power is applied from source 41 to motor 45 through winding 43 is sufficient to drive the capacitor in the proper direction to reach in a short time the desired tuning. The position of capacitor 101 then is in correspondence with the frequency of the intermediate power amplifier 11, which acts as a master signal source. The error signal then becomes zero or neutral. The error signals of circuit 1 depend on the departure of the unit 101 from this position of correspondence. If the capacitor 101 is substantially mistuned, the tube 33 conducts for the predetermined interval, after which both tubes 33 and 37 conduct to apply power to the motor 45 through winding 43. Accordingly, the capacitor will be driven at a much greater speed and with greater power toward the condition of stability or equilibrium. The error signal reduces as the capacitor approaches the desired position. Nevertheless, it is preferred that the system be designed to overshoot under these conditions. The error signal is then reversed and an error signal initiated on the grid 31, the tube 33 being locked out or prevented from firing as hereinafter explained. Now only tube 35 conducts and applies power from source 41 to motor 45 driving the capacitor 101 in a direction again to reduce the error signal and return it to a position of stability. It is preferred that the predetermined time interval be made less than a natural period of the hunting frequency of the system when both tubes of one of the pair 33—37, or 35—39 are applying power to the motor 45. Then the position of equilibrium is reached before the error signal again reverses. There is no hunting with proper design. Nevertheless, the desired position is reached more quickly than with conventional systems.

When one of the pair of tubes is fired, the other pair is prevented from firing. Thus when tube 33 is fired, the voltage on the anode 61 of tube 35 is shifted 90° with respect to the voltage on the anode 61 due to the capacitor 55. The grid voltage supplied through capacitor 99 is now 180° out of phase with respect to the anode voltage of the tube 35. Therefore, the anode voltage of tube 35 is ineffective to cause conduction. Tube 35 is effectively locked out or made non-conductive. Simultaneously, since the tube 35 is non-conductive, there is an appreciable voltage developed across the time delay circuit 83 to maintain bias on the control grid 85. Therefore tube 39 is also prevented from conducting. It should be noted that the cathodes of the tube 67 are connected to a voltage divider system with a somewhat positive voltage (about 90 volts in practice) to prevent an excess of bias voltage being applied to the grids 79 or 85.

It will be apparent that the system described comprises an error signal circuit and a second circuit comprising two pairs of tubes 33—37 and 35—39. The second tube circuit applies power to drive a unit, in this instance the capacitor 101 in response to a signal from the error signal circuit. The second circuit has a first response characteristic for the application of power in response to signals from the signal circuit for a predetermined time interval after initiation of an error signal. It has a second response characteristic to apply greater power in response to like signals after and only after the time interval following initiation of an error signal has elapsed. By this means, the system may be designed for the application of power after the predetermined time interval without regard to the usual hunting limitations. It is, of course, desirable that the system should not hunt when only the first response characteristic is prevailing. In other words, it is usually desirable that the system should not hunt with only one of the pair of tubes fired. The various means of the prior art may be used to that purpose in conjunction with the present invention. Notwithstanding this latter limitation, the system may be designed to apply power and drive the control unit at speeds which normally would result in hunting. Therefore, the present system drives the driven unit to its desired position more quickly than could heretofore be accomplished with an anti-hunting system.

Although the system here exemplified has been that in which a power amplifier is tuned to the same frequency as an intermediate power amplifier, it will be apparent that it has much wider application and use. Various error signal circuits could be used responsive to many other master signal circuits. Various modifications could readily be made in the tube circuits.

What is claimed is:

1. A servo system for a controlled unit, comprising an error signal circuit, connections for a source of power, connections for a motor to drive said unit, and a second circuit to apply power from said source connections to said motor connections, said second circuit having a first response characteristic for the application of power to said motor to drive said unit in response to signals from said error signal circuit for a predetermined time interval after initiation of error signals and having a second response characteristic for the application of greater power in response to like signals from said error signal circuit after and only after said time interval, said predetermined periods being less than a single period of the natural hunting frequency with the system under control of said second response characteristic.

2. A servo system comprising a controlled unit, an error signal circuit, a source of power, a motor, and a second circuit comprising a plurality of tubes through which power is applied from said source to said motor to drive said unit, said second circuit having a first response characteristic for the application of power through a number of said tubes to said motor to drive said unit in response to signals from said error signal circuit for a predetermined interval after initiation of error signals and having a second response characteristic for the application of greater power through a greater number of said tubes in response to like signals from said error signal circuit after and only after said time interval.

3. The system claimed in claim 2, said predetermined time interval being less than a single period of the natural hunting frequency with the said second response characteristic prevailing.

4. A servo system comprising a master signal source, a controlled unit to be positioned in correspondence with signals from said master source, an error signal circuit having a signal output responsive to the difference between the position of said controlled unit and the said position of correspondence, a source of power, a motor to drive said unit, and a second circuit to apply power from said source to said motor, said second circuit having a first response characteristic for the application of power to said motor to drive said unit in response to said output signals for a predetermined time interval after initiation of said output signals and having a second response characteristic for the application of greater power in response to like output signals after and only after said time interval, said predetermined time interval being less than a single period of the natural hunting frequency of said system under control of said second response characteristic.

5. For a control system including a controlled device, a driver motor, a source of A.-C. power and an error signal initiator: means responsive to a signal from said initiator for applying power to said motor during the first halves of the cycles of said A.-C. power source, whereby the said motor is driven at a reduced speed; and means for applying power to said motor after a predetermined time interval during the second halves of the cycles of said A.-C. source, whereby the said motor is then driven at an increased speed.

6. In a control system including a controlled device, a driver motor, a source of A.-C. power and an error signal initiator; means responsive to a signal from said initiator for applying power to said motor during the first halves of the cycles of said A.-C. power source, whereby the said motor is driven at a reduced speed; and means for applying during the second halves of the cycles of said A.-C. source to said motor after and only after a predetermined time interval of power application during said first A.-C. cycle halves, whereby the said motor is then driven at an increased speed; the said responsive means being effective only during the receipt of said signal.

7. The combination of elements defined in claim 5 characterized by the said predetermined time interval being longer than the natural period of hunting of said system with power applied during both cycle halves.

8. In a control system including a controlled device, a driver motor, a source of A.-C. power and an error signal initiator: a first gas tube connected to said motor and said power source and connected to said initiator and conductive responsive to a signal therefrom, whereby power is applied to said motor during the first halves of the cycles of said A.-C. power source through said tube; a second gas tube connected to said first tube, said motor and said power source; and a time delay circuit connected to said second tube, whereby power is applied to said motor through said second tube during the second halves of the cycles of said A.-C. source after and only after a predetermined time interval of power application through said first tube and the said motor is then driven at an increased speed 9. In a control system including a controlled device, a driver motor, a source of A.-C. power and an error signal initiator: a first gas tube connected to said motor and said power source and connected to said initiator and conductive responsive to a signal therefrom, whereby power is applied to said motor during the first halves of the cycles of said A.-C. power source; a time delay circuit; and a second gas tube connected to said motor, to said power source, and to said first tube and also to said time delay circuit whereby power is applied to said motor through said second tube during the second halves of the cycles of said A.-C. source after and only after a predetermined time interval of application of power through said first tube and the said motor is then driven at an increased speed; the said tubes being effective only during the receipt of said signal.

10. The combination of elements defined in claim 8 characterized by the said predetermined time interval being longer than the natural period of hunting of said system with power applied to said motor through both said tubes.

11. In a control system including a controlled device, a driver motor, a source of A.-C. power and an error signal initiator, a first means responsive to a signal from said initiator for applying power to said motor during the first halves of the cycles of said A.-C. power source, whereby the said motor is driven at a reduced speed in one direction, and means for applying power during the second halves of the cycles of said A.-C. source to said motor after and only after a predetermined time interval of signals of one sense, whereby the said motor is then driven at an increased speed in the said one direction, a second means responsive to an opposite sense signal from said initiator for applying power to said motor during the first halves of the cycles of said A.-C. power source, whereby the said motor is driven at a reduced speed in the opposite direction, and means for applying power during the second halves of the cycles of said A.-C. source, to said motor after and only after a predetermined time interval of said opposite sense signals whereby the said motor is then driven at an increased speed in the said opposite direction, and means for blocking the response of the said second responsive means during the delivery of a signal of said one sense by said initiator and blocking the response of the said first responsive means during the delivery of a signal of opposite sense by said initiator.

12. The combination claimed in claim 11 characterized by the said predetermined time interval being longer than the natural period of hunting of said system with application of power to drive said motor at increased speed.

13. In a control system including a controlled device, a driver motor, a source of A.-C. power and an error signal initiator, two similar groups of thyratron tubes of two tubes each, one and only one tube in the first group being conductive responsive to a signal of one sense from said initiator, for a predetermined time interval after the signal initiation, and both tubes in said first group being conductive responsive to said one sense signal after said time interval only if said signal persists; one and only one tube in the second group being conductive responsive to a signal of opposite sense from said initiator for a predetermined time interval after the said opposite sense signal initiation, and both tubes in said second group being conductive responsive to said opposite sense signal after said time interval only if said opposite signal persists; and means for blocking the conductivity of the said one tube in said second group during the delivery by said initiator of a signal of said one sense and blocking the conductivity of the said one tube in said first group during the delivery by said initiator of a signal of said opposite sense.

14. In a control system including a controlled device, a driver motor, a source of A.-C. power and an error signal initiator, two similar groups of thyratron tubes of two tubes each, one of which tubes in each group being conductive responsive during the first halves of the cycles of said A.-C. source to a first signal and an opposite sense second signal respectively from said initiator, whereby the power from said source is effectively applied to said motor to drive said motor respectively in one direction or the opposite direction and at a reduced speed, two time delay circuits connected respectively to the other of the said tubes in said groups, the other of said tubes in each group being conductive responsive respectively during the second halves of the cycles of said A.-C. power source after the time intervals of said delay circuits have terminated, whereby the power from said source is effectively applied to said motor to drive said motor respectively in one direction or the opposite direction and at a greater speed, and means for blocking one of said groups of tubes when the other of said groups is conductive responsive to one of said signals, neither of said groups being conductive responsive during the delivery of a neutral signal from said initiator.

15. The combination of elements defined in claim 14 characterized by the delay time of said time delay circuits being longer than the natural period of hunting of said system with both tubes of each group conductive.

16. In a control system including a controlled device, an error signal initiator, a single phase A.-C. source of power and a two-phase motor having a common terminal at one of the ends of the two windings thereof and other separate terminals at the other ends of said windings, the said windings being so wound that when energized they cause the motor to rotate respectively in opposite directions, and a common conductor to receive ground connections; means grounding one side of said A.-C. source, means connecting the other side of said A.-C. source to the said common terminal of said motor; two thyratron tubes, the plates of said tubes being connected respectively to said other terminals of said motor, the cathodes thereof being grounded and the control grids thereof being connected to said initiator, whereby said tubes respond conductively respectively to the signals of larger amplitude to ground applied to the respective control grids thereof, thereby effectively to ground one of the said other terminals of said motor and permit power to be applied to one of said windings respectively during one half of the cycles of said power; and means for blocking the conductivity of one of said tubes when the other of said tubes is responsive to a signal from said initiator.

17. In a control system including a controlled device, an error signal initiator, a single phase A.-C. source of power and a two phase motor having a common terminal at one of the ends of the two windings thereof and separate terminals at the other ends of said windings, the said windings being so wound that when energized they cause the motor to rotate respectively in opposite directions; means for grounding one side of said A.-C. source, means for connecting the other side of said A.-C. source to the said common terminal of said motor; a first and a second group of thyratron tubes of two tubes each; the plates of one tube in each of said groups being connected respectively to the said other terminals of said motor, the cathodes thereof being connected to ground and the control grids thereof being connected to said initiator, whereby the said one tube in each of said groups responds conductively to respective signals from said initiator thereby effectively to ground respectively the said other terminals of said motor; means for blocking the conductivity of the said one tube each in said groups when the one corresponding tube in the other group is responsive to a signal from said initiator; the plates of the other tubes in each group being connected to ground, the control grids thereof being connected respectively to said other terminals of said motor and to the plates respectively of the said one tube each in its own group; and two time delay circuits connected respectively to said other terminals of said motor and to the control grids of said other tube in each group, whereby the said other tubes are blocked with bias until after the duration of the time delay circuit decay after conduction by said one tube in its own group and thereupon become conductive and permit power to be applied to said windings respectively during the other half of the cycles of said power.

18. The combination of elements defined in claim 17 characterized by the decay time of said time delay circuits being longer than the natural period of hunting of said system with both said one and said other tubes of said groups conductive.

JOSEPH G. BEARD.
ROBERT W. HARRALSON.
ALEXANDER KREITHEN.

REFERENCES CITED

The following references are of record in the file of this patent:

UNITED STATES PATENTS

| Number | Name | Date |
|---|---|---|
| 1,976,614 | James | Oct. 9, 1934 |
| 2,106,965 | Wright et al. | Feb. 1, 1938 |
| 2,432,861 | Cook | Dec. 16, 1947 |
| 2,492,007 | Raymond | Dec. 20, 1949 |